United States Patent [19]

Gelecinskyj et al.

[11] Patent Number: 4,916,381
[45] Date of Patent: Apr. 10, 1990

[54] CURRENT SOURCE FOR A VARIABLE LOAD WITH AN INDUCTIVE COMPONENT

[75] Inventors: George Gelecinskyj, Richfield; Charles E. Goetzinger, Bloomington; John D. Pro, Burnsville, all of Minn.

[73] Assignee: Rosemount Inc., Eden Prairie, Minn.

[21] Appl. No.: 193,353

[22] Filed: May 12, 1988

[51] Int. Cl.⁴ .............................................. G05F 1/56
[52] U.S. Cl. .................................... 323/285; 361/73
[58] Field of Search ............... 323/266, 282, 283, 284, 323/285; 361/152, 153, 154, 155; 73/861.12, 861.16, 861.17

[56] References Cited

U.S. PATENT DOCUMENTS

| | | | |
|---|---|---|---|
| 3,942,377 | 3/1976 | Gineburg et al. | 73/861.15 |
| 4,146,832 | 3/1979 | McConnell | 323/285 |
| 4,204,240 | 5/1980 | Schmoock | 361/152 |
| 4,462,060 | 7/1984 | Schmoock | 361/154 |
| 4,483,201 | 11/1984 | Haug | 73/861.12 |
| 4,563,904 | 1/1986 | Geisler et al. | 73/861.12 |
| 4,663,976 | 5/1987 | Suzuki et al. | 361/154 X |
| 4,672,303 | 6/1987 | Newton | 323/285 |
| 4,694,240 | 9/1987 | Grunsch | 323/285 |

FOREIGN PATENT DOCUMENTS 0044314 3/1983 Japan ................................ 73/861.16

Primary Examiner—Patrick R. Salce
Assistant Examiner—Kristine Peckman
Attorney, Agent, or Firm—Kinney & Lange

[57] ABSTRACT

A current source for establishing a relatively constant current through widely differing impedances comprising a voltage potential regulator for adjustably regulating a supplied potential to provide a current to a current controller with a current sensor to supply a signal to the current controller, there being a signal supplied from the signal controller to control the voltage potential regulator. A further current rise time regulator is provided to increase the rise time occurrence provided to a commutated load.

19 Claims, 3 Drawing Sheets

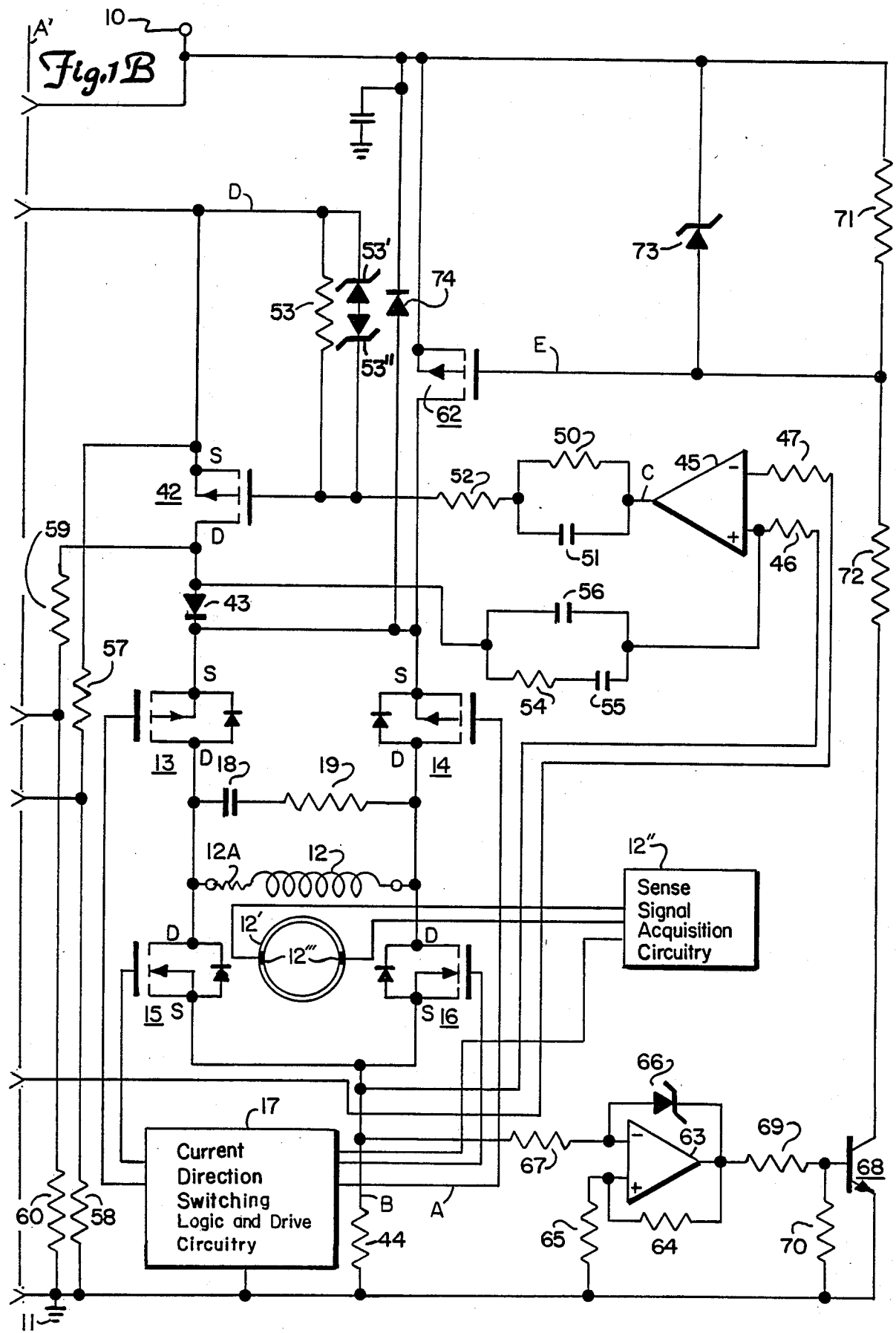

CURRENT SOURCE FOR A VARIABLE LOAD WITH AN INDUCTIVE COMPONENT

BACKGROUND OF THE INVENTION

The present invention relates to current sources for loads of a considerable range of impedance values which include an inductive component and, more particularly, to a current source for such loads through which the direction of current flow must alternate.

Current sources which provide a relatively constant current, at least for successive periods of time, are needed in many applications including ones which require establishing relatively constant magnetic fields for such periods of time. Such currents can be difficult to keep constant for such successive periods of time if the current flow direction must be reversed between each of these periods and they are of relatively short duration. This is especially so where the periods of desired current constancy are to occur periodically, with a flow direction reversal between each, and at a frequency which is significant with respect to various time constants occurring in the system in which this current is provided.

One such system in which these conditions arise is electromagnetic flowmeters. In these systems, a magnetic field is established across a metering tube through which is flowing a liquid, or liquid-like, substance which exhibits at least some electrical conductivity. Conductive media flowing through a magnetic field lead, in accord with electromagnetic theory, to the establishment of an electromotive force or voltage perpendicular to both the flow direction and the magnetic field direction, a voltage which is proportional to the average velocity of flowing fluid. The provision of electrodes at the locations in which the voltage is primarily developed permits obtaining a signal which is linearly representative of the velocity of the liquid from which its liquid flow can be determined.

However, if the magnetic field is constant in magnitude and direction, the resulting constant polarity voltage portion due to the fluid flow induced signal cannot be separated from the portion due to the electro-chemical potential of the flowing fluid and the sensing electrodes together. Further, the resulting direct signal current established in the flowing fluid, transverse to the direction of its flow, can lead to polarizing the two sensing electrodes over time thereby adversely affecting the output voltage signal representation of flow. To avoid this result, the magnetic field is usually applied to the flow tube alternately in opposite directions to balance out such transverse current flows and so avoid a net polarization of the sensing electrodes.

The frequency of reversals, or alternations of direction, of the magnetic field through the flow tube has a bearing on performance of the electromagnetic flow measurement system. On the one hand, a higher frequency of reversal will further separate that frequency from the noise in the signal taken from the sensing electrodes that is of a type which can be described as 1/f noise. On the other hand, the signal transmission leads carrying the signal from the sensing electrodes acts as a transmission line, and can be relatively long if the data capture site is a substantial distance from the flow measurement site. In these circumstances, the transmission line distributed capacitance and the resistance of the fluid will have the electrical characteristics of a low-pass filter. Thus, at some point, increasing the frequency of reversals forming the basis of periodic variation in the electrical signals from the sensing electrodes, will lead to reduced amplitudes in such signals obtained from these electrodes at the data capture location because of the filtering action of the connecting signal line.

In electromagnetic flowmeter systems, there is a desire to have a constant current flowing in magnetic field coils during the times of obtaining values representing flow from the sensed signal in any period of the alternation of the applied magnetic field. If the magnetic field is constant during such obtaining of sense signal values, there will not be much inductive pickup occurring in system portions therearound including in the apparatus used in obtaining the flow representation signal, or sense signal, from the sensing electrodes. Thus, less noise or offset will be present in this sense signal.

However, difficulty arises as the frequency of reversals of the applied magnetic field increases. The magnetic field strength B in the fluid results from various currents flowing in the electromagnetic flowmeter metering system including (i) the current applied to the coils from a current source to provide the desired magnetic field, and (ii) the resulting eddy currents which are induced to flow in the conductive metering tube and the magnetic materials in the magnetic return circuit. The magnetic field strength B in the flowing fluid thus approaches a steady value exponentially after a current reversal, due to the shielding effects of the eddy currents. Thus, changes in the B field in the flowing fluid material lag the changes in the applied current giving rise to them, and do so for a greater fraction of each of the periods of field direction alternation the more frequently the reversals occur, i.e. the shorter the period.

Hence, the amount of time that the B field is constant in each period becomes smaller and smaller as the frequency of the reversals increases thereby leading to less and less time to acquire a sensed value in the sense signal from the sense electrodes which is substantially free of inductive noise as a result of the inductive pickup noise having had time to subside. At some point of increasing frequency, this leads to an increase in the noise in the signal provided by the sense electrodes, and can lead to a substantial decrease in the magnitude of the sense signal because the B field remains substantially reduced by the eddy current in each period.

This latter condition is worsened if the applied current provided in the electromagnetic flowmeter system also has a relatively long rise time after each reversal of its direction of current flow as required to provide the corresponding reversal of the applied B field. After a current direction reversal thereof, delay in reaching a desired constant current value leads to shorter times also for the resulting B field generated by it and the induced eddy currents to come to a constant value in any period after a field direction alternation. Thus, there is a desire to shorten the rise time of the current used to provide the B field in an electromagnetic flowmeter after a flow direction reversal.

SUMMARY OF THE INVENTION

The present invention provides a current source electrically energized by a variable excitation or supply for establishing a relatively constant current between current direction reversals in selected loads of widely differing impedances. The current source comprises a potential regulator for adjustably regulating supplied potential to provide a current through a current controller, a load and a current sensing means which supplies a signal to the current controller. There is a further power regulator which receives a signal from the current controller and provides an output to the voltage regulator to adjust its output. The current to be supplied to the load can be caused to alternately switch current direction through that load by a switching commutator arrangement. A current rise time regulator is provided to increase the rise time of currents provided after a commutation of the load.

BRIEF DESCRIPTION OF THE DRAWINGS

FIGS. 1A and 1B show a schematic circuit diagram of a circuit according to the present invention.

DETAILED DESCRIPTION OF THE PREFERRED EMBODIMENTS

Figure 1A:
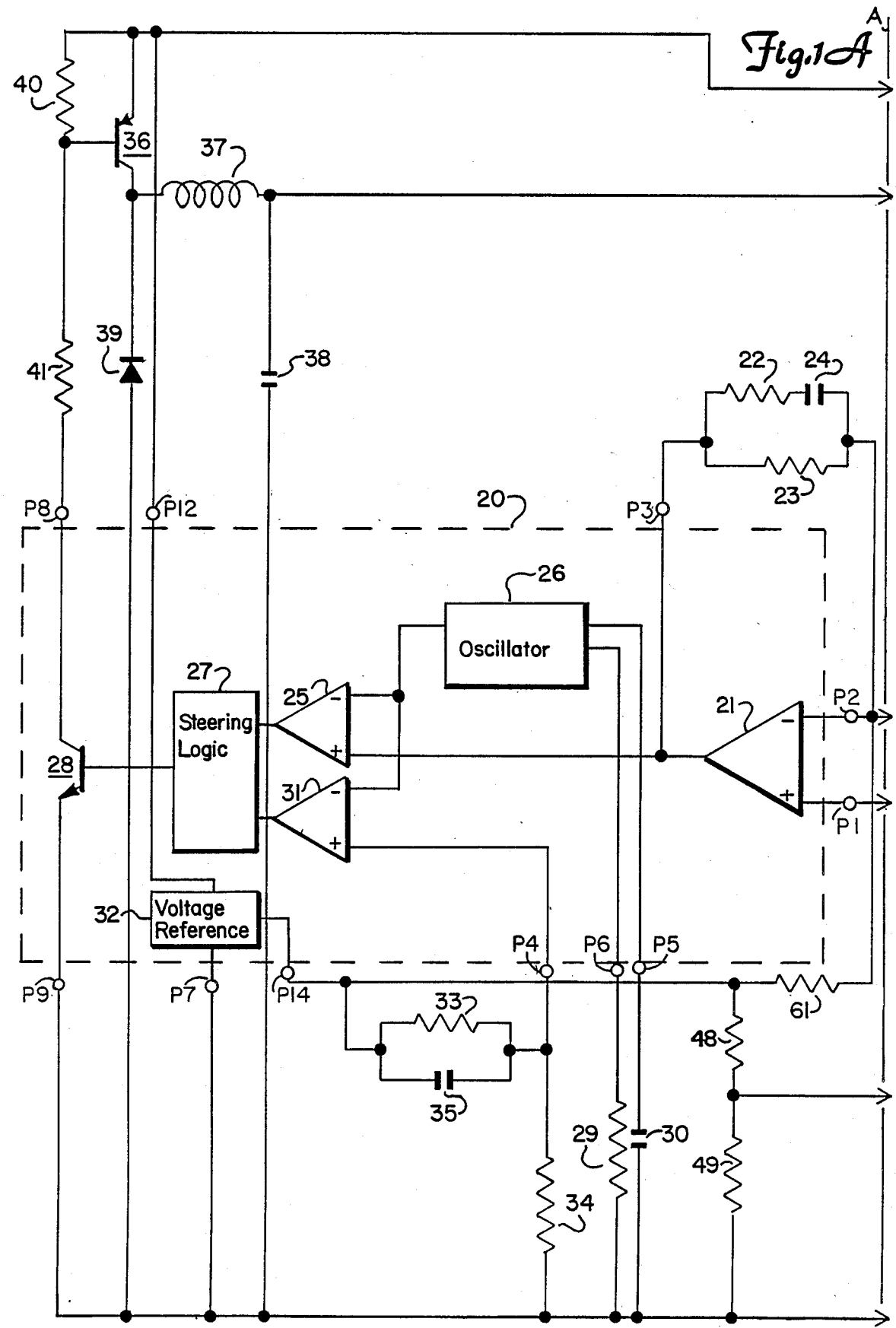

FIGS. 1A and 1B can be joined along line L—L' to form a schematic circuit diagram of an embodiment of the present invention, used here in an electromagnetic flowmeter system. The circuit is supplied a constant polarity voltage between a pair of terminals, a positive voltage of typically 40.0 V being applied at a positive voltage supply terminal, 10, with respect to a circuit common or ground reference voltage which is electrically connected to a ground reference terminal, 11.

The load element for the current source circuit of FIG. 1 comprises an electromagnetic flowmeter coil, 12, and a cable represented by resistance 12A, which are connected in a commutator bridge arrangement formed by four switching metal-oxide-semiconductor field-effect transistors (MOSFET's), 13, 14, 15 and 16. This commutation arrangement is operated by a commutator current direction switching logic and switching transistor driver arrangement, 17. Arrangement 17 first switches transistors 13 and 16 into the "on" condition with transistors 14 and 15 in the "off" condition followed by reversing these conditions of each of the pairs of transistors, and thereafter alternating between these conditions for these transistor pairs. Thus, in the first condition during the first half of a period for a cycle in this periodic switching, current can flow into the source of transistor 13, and then out its drain through coil 12 into the drain of transistor 16 followed by exiting through the source of transistor 16. In the second half of this period of the cycle, current flow through transistor 14 from source to drain, and then in the opposite direction of flow through coil 12 from the first half period, and then through transistor 15 from drain to source.

Thus, coil 12 periodically has a current applied therethrough in opposite directions to provide a periodically varying sense signal and to avoid the polarization of the sensing electrodes in that electromagnetic flowmeter system metering tube, 12', on which coil 12 is installed in the electromagnetic flowmeter system. Switching logic and driver means 17 can be formed of any suitable circuitry which provides the properly timed gating voltage pulses to transistors 13, 14, 15 and 16 to result in the described switching sequence. The frequency of current flow direction reversals set by means 17 is selectable so that it can be chosen to be best for the flow measuring conditions encountered, particularly the parameters of the fluid being measured. These parameters of such fluid can differ greatly from fluid to fluid, the most significant typically being the electrical conductivity of a fluid and its 1/f noise characteristics.

A series connection of a capacitor, 18, and a resistor, 19, are together placed in parallel with the load comprising coil 12 and cable 12A to provide a discharge path for the inductance of coil 12 during the moments of switching when all of the commutator transistors could be momentarily in a partially "off" condition as the magnetic field about coil 12 collapses to provide a temporary discharge path of a selected time constant for this energy. Typical component values are 0.22 $\mu$F for capacitor 18, and 8.7K$\Omega$ for resistor 19, selected to keep inductive spikes from coil 12 from exceeding the ratings of the commutator switches.

The load will have an effective series resistance associated with it due to the internal resistance of the coil 12 and that of the interconnection transmission line 12 A between coil 12 and the drains of transistors 15 and 16 serving as the current source load terminals. Since an electromagnetic flowmeter will be installed in many different situations so that the length of this interconnecting transmission line can vary greatly, the amount of series resistance due to such interconnections will be quite different from one situation to the next. A wide range of temperatures in some measuring situations, and from one measuring situation to the next, will further extend the resistance variation range.

Coil 12 will itself have a wide range of inductance and internal resistance from one measuring situation to the next. Accommodating the sense circuitry connected to the metering tube sense electrodes typically requires that the signal at these sense electrodes be substantially the same magnitude from one measuring situation to the next for the same flow velocity of fluid through the metering tube using the same applied current. Since the metering flow tube can have a diameter varying between a fraction of an inch to a few feet from one measuring situation to the next, there must be a wide variation in the inductance and internal resistance of coil 12 for use with these various metering flow tubes.

Thus, the potential provided across the load terminals of the commutator arrangement to which coil 12 is connected must vary significantly from situation to situation to provide essentially the same absolute value current flow in coil 12 in each such situation. As indicated above, similar absolute value current flow is required in each measuring situation to assure that magnetic fields developed thereby are of the magnitudes desired to provide a signal indicative of the flow rate through the flow tube which is generated on a consistent basis in each situation for the sense signal acquisition circuitry, 12", connected to a pair of sensing electrodes, 12''', in tube 12'. Further, as indicated above, the currents must be maintained constant in each flow direction through coil 12 for a sufficient portion of the time during flow in each direction in each alternation period to permit an accurate reading to be obtained in this the same signal acquisition circuitry connected to the electrodes in the flow tube.

The need to achieve rapid current magnitude increases after each applied current flow direction reversal at the highest reversal frequencies if relatively large effective resistance is in series with coil 12, and coil 12 has a relatively large inductance, is a situation demanding a relatively large voltage being provided at the commutator arrangement lead terminals. Yet, efficient use of electrical power is required of the circuit supplying voltage at these terminals in other measuring situations in which lower applied current flow direction frequencies are used or when smaller values of effective resistance is in series with coil 12 or coil 12 has smaller inductances, or in situations in which a combination of these reduced values are present. Thus, the remaining circuitry shown in FIG. 1 is directed toward providing this result.

Because of the need for a variable potential at the commutator load terminals to which coil 12 is connected in different situations, and yet an essentially constant valued current flow between them in alternate directions on alternate half cycles in every situation, the circuit of FIG. 1 must provide for such a varying magnitude voltage but with a well controlled current flow for each such voltage. This could be accomplished by just changing a voltage supply means output voltage in a single feedback loop. However, to maintain satisfactory power efficiency there is a need for a switching regulator as the supply of voltage. Such switching regulators are well known to have delays therein in adjusting output voltage values at the output thereof in response to changing adjustment signals at an input thereof. This means a relatively slow loop response in adjusting currents when current value errors arise because of changing conditions in which the desired fixed current value flow must be met in alternate half cycles.

The circuit of FIG. 1 has, instead, two feedback loops for controlling the voltage and the current substantially separately. A switching regulator is used here also for maintaining power efficiency, this regulator being based in part on a commercially available monolithic integrated circuit with the portions therein substantially used in the circuit of FIG. 1 shown in block diagram form within a dashed line box, 20. The numbers thereabout preceded by the letter p are the pin numbers for the commercial integrated circuit available from Unitrode Integrated Circuits under the designation UC 494A.

In block 20, an error amplifier, 21, receives signals indicating error in the regulator output voltage as measured by external circuit portions connected to its inverters and non-inverting inputs. External feedback elements including a pair of resistors, 22 and 23, and a capacitor, 24, are used to set the gain of the circuitry involving error amplifier 21 as well as to set its frequency response as will be described later.

The error signal, after undergoing amplification provided by amplifier 21 and its associated circuitry, is provided to the non-inverting input of a comparator, 25. Further supplied to the inverting input of comparator 25 is the output of a fixed frequency oscillator, 26. Comparator 25 compares the filtered and amplified error voltage, supplied thereto from the output of error amplifier 21, with the fixed frequency periodic sawtooth output voltage provided thereto by oscillator 26 to generate a variable-width pulse output signal at the output of comparator 25.

That is, a pulse width modulated signal is provided at the output of comparator 25 to a digital circuit arrangement, 27, providing certain logic functions which result at the output of logic circuit 27 in a switching signal at the base of an npn bipolar transistor, 28, having its emitter connected to ground reference terminal 11. Transistor 28 is switched from the "on" condition to the "off" condition, and back, alternately, in accordance with the signal provided at the output of comparator 25 in such a manner that the relative time that transistor 28 is in the "on" condition versus the "off" condition is adjustable by the pulse width of the comparator 25 pulse width modulated output signal.

The fixed frequency of oscillator 26 is selected by the choice of values for a resistor, 29, and a capacitor, 30, connected thereto in the integrated circuit within box 20 and to ground reference terminal 11. Values chosen to set the oscillator frequency at about 40 KHz are 13KΩ for resistor 29 and 2200 pF for capacitor 30.

The fixed frequency oscillating signal from the output of oscillator 26 is also supplied to a further comparator, 31, at its inverting input. A voltage reference, 32, provides a fixed output voltage of typically 5.0 V, a portion of which is provided to the non-inverting input of comparator 31 through a voltage divider arrangement connected between the output of voltage reference 32 and ground reference terminal 11. This voltage divider is comprised of a pair of resistors, 33 and 34, and a capacitor, 35, which is parallel with resistor 33. Typical values for these components are 390 KΩ for resistor 33 and 100 KΩ for resistor 34, with capacitor 35 having a value of 10 µF which acts to delay the decrease in voltage supplied at the input to comparator 31 to delay starting the operation of the switching regulator at initial application of circuit power.

The voltage developed at the juncture of resistors 33 and 34 provided to the non-inverting input of comparator 31 determines the minimum amount of "off" time for transistor 28 limiting the amount of time it is in the "on" condition to prevent damage to the power supply components due to the need to dissipate heat from current flowing therethrough for too long a period of time. The output of comparator 31 is also supplied to steering logic 27 to accomplish this purpose in controlling transistor 28.

Transistor 28 controls a further transistor, 36, external to the integrated circuit in box 20 which is a pnp bipolar transistor. The emitter of transistor 36 is connected to positive voltage supply terminal 10, and the collector of transistor 36 is connected to an inductor, 37, which in turn is connected to a capacitor, 38, that is connected between inductor 37 and ground reference terminal 11. Inductor 37 and capacitor 38 are also external to the integrated circuit in box 20. The juncture of inductor 37 and capacitor 38 forms the output of the switching regulator of FIG. 1, and together provide a low-pass filter to average the voltage pulses provided by switching "on" and "off" of transistor 36 under the control of transistor 28 and the rest of the integrated circuit in box 20. Inductor 37 typically has a value of 220 µH, and capacitor 38 has a typical value of 10 µF.

The collector of transistor 36 is also connected to a diode, 39. Diode 39 has its cathode connected to the juncture of the collector of transistor 36 and inductor 37, and has its anode connected to ground reference terminal 11. Diode 39 provides a path for current through inductor 37 when transistor 36 is in the "off" condition in switching back and forth between this condition and the "on" condition as directed by transistor 28.

Transistor 28 controls such switching of transistor 36 through a pair of resistors, 40 and 41. If transistor 28 is in the "off" condition, no significant current flows in either resistors 40 or 41 so that the base of transistor 36 is at approximately the voltage appearing on positive voltage supply terminal 10. If, on the other hand, transistor 28 is in the "on" condition, current will be drawn by its collector through resistors 40 and 41 sufficiently lowering the voltage of the gate of transistor 36 to switch it into the "on" condition.

Thus, constant polarity or direct voltage is provided at the juncture of inductor 37 and capacitor 38 as a source of electrical energy for operating coil 12 as will be described below. The value of this voltage is controlled by signals occurring at the inputs to error amplifier 21, a capability which will be made use of as will be described below.

The application of this regulated voltage from the juncture of inductor 37 and capacitor 38, and the current supplied therefrom as a result, is controlled in its application to the commutating arrangement described above, including coil 12, by a further p-channel MOSFET, 42, having its source connected to this regulated voltage supplied at the output of the switching regulator of the juncture of inductor 37 and capacitor 38. Transistor 42 is controlled in turn by a first feedback loop in its supplying of current to the commutation arrangement at the regulated voltage value provided at this switching regulator output. This feedback loop further includes a diode, 43, having its anode connected to the drain of transistor 42 and its cathode connected to the commutation arrangement, specifically with its cathode connected to the sources of transistors 13 and 14 together. The loop continues on the other side of the commutating arrangement with a current sensing resistor, 44, connected between the sources of transistors 14 and 16 together and ground reference terminal 11. A typical value for resistor 44 will be 2.0 Ω.

This feedback loop is completed by a feedback amplifier arrangement driving the gate of transistor 42. This feedback amplifier arrangement includes an operational amplifier, 45, which is of a high voltage type so that its output can rise to the maximum positive voltage level which appears at the switching regulator output at the juncture of inductor 37 and capacitor 38, this voltage being around 38.0 V. The non-inverting input of amplifier 45 is electrically connected through a resistor, 46, typically of 10 kΩ to the junction of resistor 44 and the sources of transistors 15 and 16 together. Resistor 46 is used in setting the frequency response of the amplifier 45 circuit in connection with a minor feedback loop about amplifier 45 as will be described below. Thus, the current through coil 12 provides a voltage across resistor 44, which voltage is supplied to amplifier 45 as a measure of the current through resistor 44 and so through coil 12.

The inverting input of amplifier 45 is connected through another resistor, 47, also typically of 10 kΩ, to a reference voltage. Resistor 47 is used in balancing offsets in amplifier 45. The reference voltage is approximately 1.0 V and is supplied at the juncture of a pair of voltage divider resistors, 48 and 49. Resistor 48 has as typical resistance value of 5.11 kΩ, and resistor 49 has a typical resistance value of 1.28 kΩ. Resistor 48 has its opposite end connected to the output of voltage reference 32 supplying 5.0 V as indicated above. The opposite end of resistor 49 is connected to ground reference terminal 11.

Because a major or primary feedback loop has been provided around amplifier 45, as has been indicated above, the effect is to keep the potential difference between the inverting and non-inverting inputs of amplifier 45 approximately zero in value. Thus, the feedback loop will act to provide a current through resistor 44 which provides approximately a 1.0 V voltage drop thereacross. The resulting current through coil 12, 1.0 V divided by 2.0 Ω, is thus set to be 0.5 A in the present example shown in FIG. 1.

The output of amplifier 45 is connected to the gate of transistor 42 through a parallel arrangement involving a resistor, 50, and a capacitor, 51, which together are in series with a further resistor, 52. The gate of transistor 42 is also connected to the regulated voltage supplied at the juncture of inductor 37 and capacitor 38 by a further resistor, 53. In parallel with resistor 53 are a pair of back-to-back Zener diodes, 53' and 53", which prevent the voltage on the gate of transistor 42 from differing from the voltage on its source by more than 18.0 V in either polarity to prevent exceeding the gate-to-source breakdown limits of transistor 42. Typical component values are 22 kΩ for resistor 50, 1 kΩ for resistor 52, and 100 kΩ for resistor 53. Capacitor 51 is typically 0.1 μF. These component values are chosen for a particular type of amplifier 45 and transistor 42, and would change with other choices for such amplifiers and transistors because of their differing characteristics.

Resistor 33, with respect to the series connection of resistors 50 and 52, forms a voltage divider arrangement across the gate of transistor 42 between the regulated voltage supply and the output of amplifier 45. This arrangement allows choosing the amplifier 45 output to be at a nominal voltage point compatible with its range of output voltage and with operating transistor 42 when it is to be switched into the "on" condition. Because amplifier 45 is a high voltage amplifier, the output voltage value can rise to the output of the voltage regulator to restrict conductance through transistor 42, but can also drop to switch transistor 42 strongly into the "on" condition.

Because of the need to keep this feedback loop operating rapidly to restore current flows through coil 12 after the current has been switched off therein in preparation for reversing the flow through this coil, capacitor 51 is used across resistor 50 to increase the rate that the output signal of amplifier 45 is applied to the gate of transistor 42. Resistor 52 limits this rate somewhat, but allows a significantly greater signal to initially be applied to the gate of transistor 42 than would be possible if resistor 50 was not bypassed at the beginning of bringing current through coil 12 up to the desired constant value in the next half cycle after each switching of current flow direction in coil 12.

However, this feedback loop cannot be allowed to operate so rapidly as to have oscillations occur after each switching of current flow direction through coil 12. This is because such oscillations or "ringing" after a sharp switching pulse would be introduced into a second feedback loop (to be described) which can have adverse consequences. As a result, a local, or minor, feedback loop arrangement is provided around amplifier 45 to shape the frequency response of the local feedback loop around amplifier 45 so as to shape the frequency response of the major feedback loop in which amplifier 45 is present as described above.

This local feedback loop extends through transistor 42 and then through a resistor, 54, in series with a capacitor, 55, to the non-inverting input of amplifier 45. A further capacitor, 56, is parallel with this series combination of resistor 54 and capacitor 55. Thus, this entire combination of passive components is connected between the drain of transistor 42 and the non-inverting input of amplifier 45. Typical component values are 1.8 MΩ for resistor 54, 0.1 μF for capacitor 55, and 820 pF for capacitor 56. This choice of values allows the major feedback loop to be approximately critically damped in permitting only a small amount of damped oscillation or overshoot of relatively short duration after a switching of the current direction through coil 12.

Figure 2:
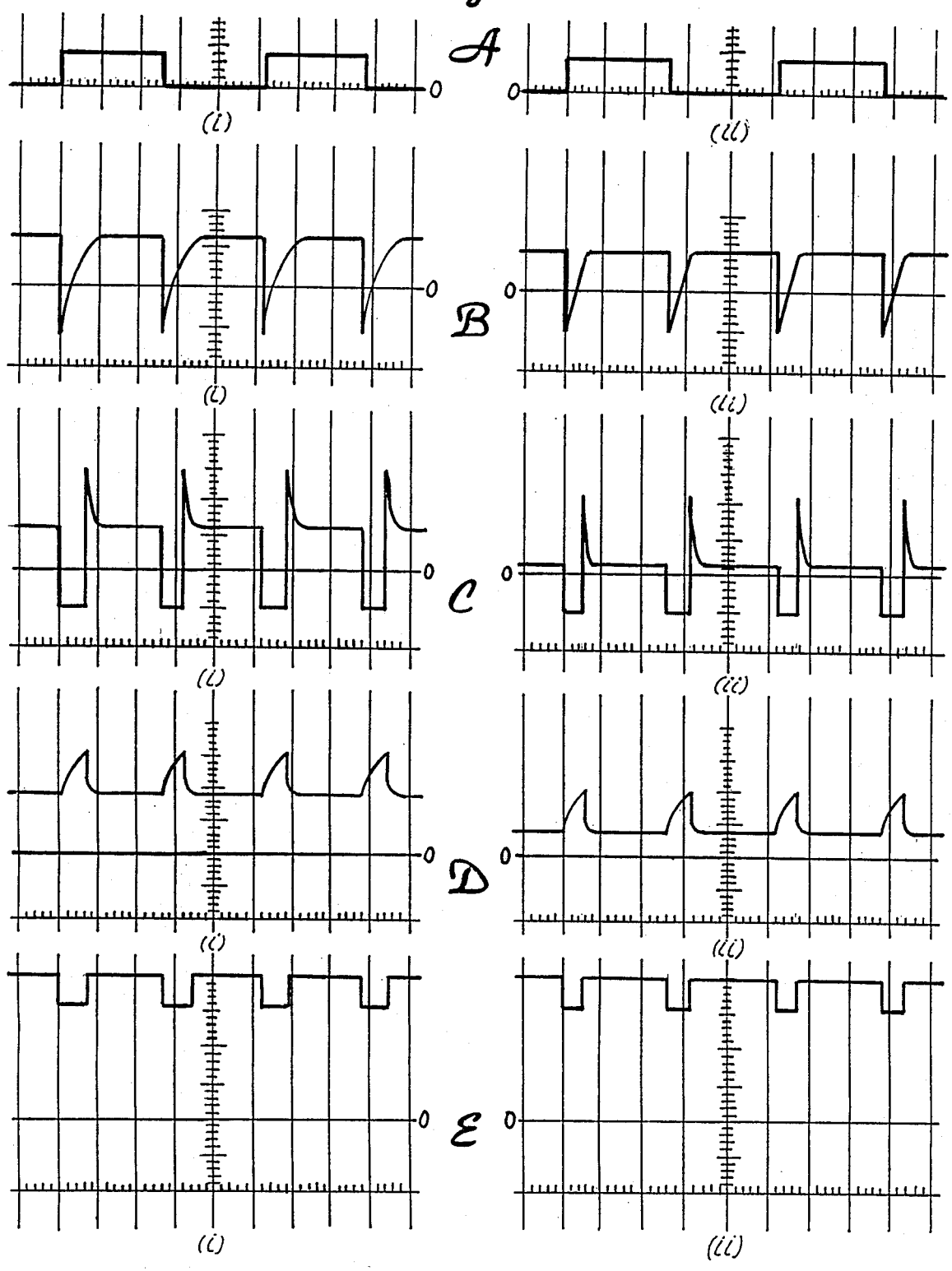
FIGS. 2A through 2E show waveforms characteristic of the circuit of FIG. 1.

The performance of this major feedback loop is indicated in the waveforms shown in FIGS. 2A, 2B and 2C. FIG. 2A shows the switching pulses applied to the gate marked A in FIG. 1B of the commutating transistor 14 as the timing base used by logic and driver arrangement 17 to operate the commutator arrangement, in this instance the voltage applied to the gate of transistor 13. There is a voltage level transition in this waveform every half cycle. Since this controls the switching of the commutator arrangement, and so the current reversals through coil 12, this commutator timing base is a convenient choice for the timing base of the system of FIG. 1. The timing base on the left in FIG. 2A is identical to the one on the right but the two of them are provided because alternative load examples are presented side-by-side in the graphs of FIG. 2.

In FIG. 2A(i), the load is coil 12 chosen to have an inductance value of 100.0 mH, and have in series therewith a resistive load of approximately 26.5 $\Omega$. The load in FIG. 2A(ii) is again a coil 12 having an inductance value of 100.0 mH in series with an effective resistance of 5.5 $\Omega$. The commutator arrangement switching frequency shown for both examples is 37.5 Hz.

FIG. 2B shows the resulting currents through coil 12 as measured by the voltage across resistor 44 from the point marked B in FIG. 1B. As can be seen, there is approximately a 1.0 V maximum voltage plateau reached in each half cycle across resistor 44 in accord with 0.5 A maximum passing through 2.0 $\Omega$. In accordance with the different series resistances in the two example loads, the rise time can be seen to be somewhat longer to reach the maximum voltage in the graph of FIG. 2B(i) than is required in the graph of FIG. 2B(ii) because of the smaller resistance load in series with coil 12 in the latter.

FIG. 2C shows the resulting signals occurring at the output of amplifier 45, at the point marked C in FIG. 1B, which controls the gate of transistor 42. As can be seen in FIG. 2C(ii), because of the relatively low value of effective resistance in series with coil 12, transistor 42 operates at a voltage in the steady value portion of a half cycle which does not differ too greatly from the voltage drop across coil 12. Similarly, the gate of transistor 42 operates at a voltage relatively close to ground or zero volts. This figure shows a gate operating at 2.0 V after the initial switching transient has decayed. Note that the switching oscillation is well controlled after the switching event.

FIG. 2C(i) with the larger load, would exhibit slightly greater switching damped oscillation or overshoot in the waveform (not shown) because the capacitances in the feedback loop are charged to a significantly higher voltage. The gate of transistor 42, with a higher series resistance load, is shown operating at approximately 12.0 V with respect to ground because a significantly greater voltage must be dropped across this series resistance so that the voltages on the gate of transistor 42 differ considerably from those across coil 12. This differing voltage change across the effective series resistance with coil 12 comes about because of the action of the second feedback loop in the circuit of FIG. 1 as indicated above.

This second loop is used to control the voltage drop occurring between the source and drain of transistor 42.

This voltage drop is sensed by error amplifier 21 in the monolithic integrated circuit in box 20 through a pair of voltage dividers. The first of these voltage dividers is formed by a pair of resistors, 57 and 58, and extends between the source of transistor 42 and ground reference terminal 11. Typical resistance values for these two resistors are 20 k$\Omega$ for resistor 57, and 4.99 k$\Omega$ for resistor 58. The juncture of these two resistors is connected to the non-inverting input of error amplifier 21.

The drain of transistor 42 has a further voltage divider extending from there to ground reference terminal 11 formed by two other resistors, 59 and 60. Typical resistance values for these resistors are 20 k$\Omega$ for resistor 59 and 5.1 k$\Omega$ for resistor 60. The juncture of these resistors is connected to the inverting input of error amplifier 21. These voltage dividers are used to provide for a differential input to comparator 21 and to reduce the voltage levels encountered at the source and drain of transistor 42 to values suitable for the inputs of error amplifier 21.

The resistance value of resistor 60 in the one voltage divider is chosen to be slightly larger than that of corresponding resistor 58 in the other because of the providing of a further resistor connected to the juncture of resistors 59 and 60. This further resistor, 61, is connected from this juncture to the 5.0 V output of voltage reference 32. Resistor 61 has a typical impedance value of 180 k$\Omega$ and, for signal purposes, is effectively in parallel with resistor 60 to thereby lower the resistance value of this combination to being approximately that of resistor 58. Resistor 61 conducts a reference current to the inverting input of error amplifier 21 to set the reference value against which error amplifier 21 will compare the voltage drop occurring between the source and drain of transistor 42. The feedback loop of which error amplifier 21 is a part, as will be described below, acts to maintain the voltage value across transistor 42 at the level selected by choosing the resistance value of resistor 61, here being 0.5 V between the source and drain of transistor 42.

This second feedback loop for controlling the voltage difference across the source and drain of transistor 42 comprises error amplifier 21, comparator 25, steering logic 27, bipolar transistor 28 operating bipolar transistor 36 in providing an output voltage at the juncture of inductor 37 and capacitor 38, serving as the switching regulator output, to which the source of transistor 42 is connected. Thus, should the voltage deviate from approximately 0.5 V between the source and drain of transistor 42, this feedback loop will act to raise or lower the voltage at the output of the switching regulator at the juncture of inductor 37 and capacitor 38 to counteract any change across transistor 42.

As an example, if a higher effective resistance appears in series with coil 12 or the voltage on terminal 10 decreases, there would tend to result a reduced flow of current through coil 12 and so through resistor 44. A smaller voltage across resistor 44 would provide a smaller voltage at the non-inverting input of amplifier 45 thereby reducing the output voltage thereof. This would result in amplifier 45 attempting to switch transistor 42 further into the "on" condition to nearly immediately draw more current from charged capacitor 38 to maintain the current supply to the load which is the purpose of the first feedback loop. Transistor 42, in being switched further into the "on" condition, would tend to result in lowering the voltage drop between the source and drain thereof. Such a reduction of the voltage across transistor 42 would be sensed by error amplifier 21 and result in an increase in voltage being provided at the output of the switching regulator and so at the source of transistor 42. Since this second feedback loop assures that the voltage across transistor 42 is held at approximately 0.5 V, essentially all of the additional voltage provided at the switching regulator output will then appear across the effective resistance in series with coil 12. A similar, but opposite, result would ensue for a decrease in the effective resistance in series with coil 12.

Error amplifier 21 also has a local feedback loop thereabout, both to set its gain and to shape its frequency response to in turn shape the frequency response of the major feedback loop about amplifier 21 just described. These feedback components, having already been described as external to the integrated circuit within box 20, are resistors 22 and 23 and capacitor 24. Resistor 23 sets the gain of the amplifier 21 circuit in conjunction with the voltage divider resistors connected to its inputs. Resistor 22 and capacitor 24 shape the frequency response, and have been chosen so that again there is approximately critical damping in the major feedback loop holding the voltage across transistor 42, with there being relatively little overshoot or undershoot occurring for switching transients caused therein by the switching of transistor 42 in response to current reversals in coil 12 provided by the commutator arrangement. Typical values for these feedback components are 6.2 k$\Omega$ for resistor 22, 2.2 M$\Omega$ for resistor 23, and 0.01 $\mu$F for capacitor 24..

Note that any instability occurring in the first feedback loop, reflected in rapid voltage changes between the source and drain of transistor 42, would also be introduced in the second feedback loop. Eliminating any such oscillating as the result of commutator switching in either loop is important because a substantial undershoot will lead to the switching regulator switching transistor 36 being fully "on" for a large fraction of the period of oscillator 26 risking destroying transistor 36 because of the resulting heat dissipation therein as well as similarly damaging the integrated circuit in box 20. Thus, the choice of damping for these two loops is important to permit use of a transistor for transistor 36 which is not too large in size nor requires too much heat sinking because of economic and packaging requirements.

FIG. 2D shows the voltage occurring at the juncture of inductor 37 and capacitor 38, the output of the switching regulator, at the point marked D in FIG. 1B. As can be seen in FIG. 2D(ii), as a switching event leading to a current reversal begins during which the commutator arrangement temporarily has a partially open circuit and during which little current flows as its direction is being switched through coil 12, the voltage on the switching regulator output rapidly rises toward the voltage occurring on terminal 10. Transistor 42 is switched strongly "on" by its major feedback loop attempting to increase current therethrough. The voltage drop across transistor 42 in these circumstances tends to get smaller so the major feedback loop around the switching regulator acts to increase the regular voltage output. Thereafter, as current is again established through the commutator arrangement and coil 12, the voltage of the switching regulator output drops down to a steady value of about 8.0 V. On the other hand, with a larger series resistance load, FIG. 2D(i) shows the same behavior but with a relatively constant voltage of about 18.0 V, this additional voltage being a drop across the additional effective series resistance.

Returning to FIG. 2B, the rise time of these waveforms shown is due not to just the first two feedback loops already described, but is further benefitted by a current rise time improvement circuit, or initial current booster circuit. This circuit permits the provision of a greater initial voltage after a current reversal switching of coil 12, and so a greater rate of current increase to be introduced therethrough than could be provided by the first two major feedback loops to thereby hasten the rise time of the current to the steady level achieved after the switching transient ends.

This initial current is provided through another p-channel MOSFET, 62. The current is supplied directly from positive voltage supply terminal 10, rather than from regulated voltage, since this provides an immediate high value voltage source to provide the initial current. This initial current will be supplied only a relatively short time immediately after the beginning of switching current flow direction event, just during the switching transient following the establishment of a sufficient current in the opposite direction through coil 12. This time will be sufficiently short so that the voltage at positive voltage supply terminal 10 will not play a significant role during the time that the current is relatively constant through coil 12 in a half cycle, and thus its lack of regulation will not cause noise in the sensed signal.

Such a result is accomplished using a hysteresis switch based on an operational amplifier, 63. The inverting input of amplifier 63 is connected to the juncture of resistor 44 and the sources of transistors 15 and 16 together so that it can also measure the current present through coil 12 by noting the voltage drop across resistor 44 due to this current. When this voltage drop is negative because of the reversing of the current through coil 12 by the commutator arrangement leading to a reverse voltage because of the collapsing magnetic field in coil 12, the output of amplifier 63 is driven towards a positive voltage. As this output voltage becomes sufficiently positive, the positive feedback voltage divider action provided by a pair of resistors, 64 and 65, rapidly forces the output voltage of amplifier 63 to the point that a Zener diode, 66, breaks down in the reverse direction. At this point, the output is clamped to that Zener diode voltage plus the voltage drop across resistor 65. Typical resistance values for resistors 67 and 65 are 10 k$\Omega$ and 7.5 k$\Omega$ for resistor 64. Zener diode 66 has a typical breakdown voltage of 6.2 V. Current is limited through Zener diode 66 by a further resistor, 67, having a typical impedance of 10 k$\Omega$.

This positive voltage state with Zener diode 66 broken over is a stable state for the hysteresis switch, and so the positive voltage at the output of amplifier 63 is maintained and applied to a npn bipolar transistor, 68, through a voltage divider arrangement provided between the output of amplifier 63 and ground reference terminal 11. This voltage divider arrangement is formed of a pair of resistors, 69 and 70, joined to one another at a juncture connected to the base of transistor 68. Resistor 69 typically has a resistance of 10 k$\Omega$ and resistor 70 has a typical resistance of 4.7 k$\Omega$. Transistor 68, having its emitter connected to ground reference terminal 11, is switched strongly into the "on" condition and draws a current at its collector through a further pair of resistors, 71 and 72, which again act as a voltage divider with the gate of MOSFET 62 connected to their juncture. The other end of resistor 71 is connected to positive voltage supply terminal 10 while the opposite end of resistor 72 is connected to the collector of transistor 68. Typical resistance values for resistors 71 and 72 are 15 kΩ and 33 kΩ, respectively.

Another Zener diode, 73, limits the voltage which can be applied between the gate and the source of MOSFET 62 because of the limits on such voltage if MOSFET 62 is not to be damaged. Further, a diode, 74, has its anode connected to the juncture of the drain of transistor 62 and the sources of transistors 13 and 14, and has its cathode connected to positive voltage supply terminal 10. Diode 74 permits coil 12 to discharge current therethrough and resistor 44 during switching reversals as the field around coil 12 collapses to thereby initiate the switching of amplifier 63 to place its output at a positive voltage as described above.

This sharp switching "on" of transistor 62 provides the initial current flow into the commutator arrangement and so through coil 12. The switching of transistor 62 into the "on" condition reverse biases diode 43 thereby isolating other circuit portions from the actions of transistor 62 and preventing current flow from the switching regulator through MOSFET 42 into the commutator arrangement and coil 12. In conjunction with the above description, the rise in the switching regulator output voltage occurs when transistor 42 is actually conducting no current as diode 43 is reversed biased.

As the initial current flow through MOSFET 62 increases to thereby also increase through coil 12 after a switching reversal, the voltage also increases across resistor 44 to the point that it becomes sufficiently positive to drive the output of amplifier 63 towards a negative voltage. A sufficiently negative voltage is achieved at the output of amplifier 63 so that the voltage divider action of resistors 64 and 65 at its non-inverting input holds the output of amplifier 63 at the negative voltage to which it is clamped by the forward voltage drop of Zener diode 66.

Thus, transistors 68 and 62 are switched into the "off" condition and no longer provide current to the commutator arrangement involving coil 12. Rather, diode 43 becomes forward biased and current is supplied only through transistor 42 to the commutator arrangement and coil 12 at that point. As a result, the initial current flow in a half cycle supplied through transistor 62 ends as a sufficient current is reached through resistor 44, after which current is then supplied through transistor 42 from the switching regulator.

As can be seen in FIG. 2E, which is the waveform at the gate of transistor 62 marked E in FIG. 1B, transistor 62 operates either in the "on" condition or in the "off" condition. FIG. 2E(i) shows there is no difference in the voltage levels of operation with a smaller series resistance load as compared with the operating voltage levels shown in FIG. 2E(ii). However, the "on" condition time in FIG. 2E(i) in a half cycle is a little less than in FIG. 2E(ii) reflecting the differing current rise times through coil 12 and the different resistances effectively in series therewith in these two figures. The waveform switches approximately between 40.0 V and 31.0 V.

Although the present invention has been described with reference to preferred embodiments, workers skilled in the art will recognize that changes may be made in form and detail without departing from the spirit and scope of the invention.

What is claimed is:

1. A current source adapted to be energized from a supply and having first and second load terminals, said current source being capable of providing a load current between said first and second load terminals, if a selected load device is electrically connected therebetween, which has a substantially constant value over a range of load conditions, comprising:
    regulator means coupled to the supply for providing a regulated potential output, the regulator means having a potential adjustment input such that a signal provided at the potential adjustment input regulates the regulated potential output;
    current controller means having a current path therethrough coupled in series between the regulated potential output and one of the load terminals, the current path having an adjustable impedance for controlling current flow through a load device if it is electrically connected between the first and second load terminals, the current controller means further having a current controller input for controlling the adjustable impedance;
    current sensing means having a current input coupled in series with one of the load terminals for carrying a load current, the current sensing means further providing a current sense output representative of an amplitude of such a load current coupled to the current controller input for maintaining the current substantially constant; and
    power sensing means coupled to the adjustable impedance for providing a power output representative of the power dissipated in the adjustable impedance, the power output being coupled to the potential adjustment input for maintaining the power dissipated in the adjustable impedance at a preselected power level.

2. The current source of claim 1 wherein a commutator conducts such load current as occurs from the current source to a load device if connected and the current source further comprises current rise time regulator means coupled between the supply and the load terminals for restoring the current to the substantially constant value after commutation.

3. The current source of claim 2 wherein the current rise time regulator further comprises:
    an actuator switch for electrically coupling the supply to the commutator; and
    means for actuating the switch if a load current flow falls below a selected value less than the substantially constant value after commutation.

4. The current source of claim 1 wherein the regulator means comprises a switching regulator delaying the regulated potential output with respect to a change in the potential adjustment input and wherein the power sensing means further comprises:
    damping means coupled to the switching regulator for reducing overshoot of the regulated potential output.

5. The current source of claim 1 wherein the current controller means further comprises:
    means coupled to one of the load terminals for damping the adjustment of the adjustable impedance relative to a change in any load current flowing such that overshoot of such current above the substantially constant value is reduced.

6. The current source of claim 1 wherein the current sensing means comprises a resistor coupled in series with one of the load terminals for carrying any load current flowing.

7. The current source of claim 1 wherein a load device is electrically connected between the first and second load terminals which comprises inductance and resistance coupled in series to carry a load current.

8. The current controller device of claim 2 wherein a load device is electrically connected between the first and second load terminals which comprises an inductance and the current controller further comprising diode means coupled between the regulated potential output and the commutator for reducing a flow of inductive current from the load device back to the regulator means.

9. The current controller of claim 2 wherein the current rise time regulator further comprises:
  switch means coupled to the current sensing means for providing a switch connection between the supply and the commutator, the switch connection being actuated, with hysteresis, by the current sensing means when a load current flow falls below a selected level.

10. The current source of claim 3 wherein the commutator further comprises four solid state switches arranged in a bridge circuit and current direction switching means for controlling the switches to provide commutation.

11. The current source of claim 3 wherein the current sensing means comprises a resistor carrying load current flowing between the commutator and the supply.

12. The current source of claim 4 wherein the power sensing means further comprises an operational amplifier receiving feedback from the damping means.

13. The apparatus of claim 5 wherein the current controller further comprises an operational amplifier receiving feedback from the means coupled to one of the load terminals for providing damping.

14. The current controller of claim 7 wherein the selected load device comprises an inductor providing a magnetic field in a magnetic flowmeter system.

15. The current controller of claim 8 wherein the inductance generates surges after commutation and said surges are conducted back to the supply by a plurality of diodes.

16. A current source adapted to be energized by a variable excitation and having first and second load terminals, said current source being capable of providing a controlled current between first and second load terminals if a selected load having inductance and resistance values in selected load ranges is electrically connected therebetween, comprising:
  first regulator means coupled to said variable excitation for providing an output potential regulated as a function of a first adjustment input applied to said first regulator means;
  second regulator means coupling said output potential to said load terminals for providing a current path controlling a current sensed to be flowing through such a load if it is electrically connected between said first and second load terminals; and
  circuit means coupled to said second regulator means for sensing a potential drop in said current path and providing an output representative of said potential drop to said first adjustment input such that said potential drop is maintained substantially constant, whereby power dissipation of said current source is reduced while current regulation is maintained over said selected load ranges.

17. The apparatus of claim 16 wherein a selected load is electrically connected between said first and second load terminals, said load is an inductor provided about a metering tube in an electromagnetic flowmeter system and has inductance and resistance values in said selected load ranges.

18. The apparatus of claim 16 wherein said first regulator means is a switching voltage regulator.

19. The apparatus of claim 16 wherein said second regulator means is a transistor operated by a current sensing means.

* * * * *

UNITED STATES PATENT AND TRADEMARK OFFICE
CERTIFICATE OF CORRECTION

PATENT NO. :  4,916,381

DATED      :  April 10, 1990

INVENTOR(S) :  George Gelecinskyj et al.

It is certified that error appears in the above-identified patent and that said Letters Patent is hereby corrected as shown below:

TITLE PAGE:

In the References Cited Section, under U.S. PATENT DOCUMENTS, delete "Gineburg", insert --Ginzburg--.

Col. 8, line 21, delete "Resistor 33", insert --Resistor 53--.

Col. 16, line 31, delete "is", insert --being--.

Signed and Sealed this

Eleventh Day of August, 1992

Attest:

DOUGLAS B. COMER

Attesting Officer          Acting Commissioner of Patents and Trademarks